US012722766B2

(12) United States Patent
Fitton et al.

(10) Patent No.: US 12,722,766 B2
(45) Date of Patent: Sep. 1, 2026

(54) AIRSHIP

(71) Applicant: SkyLifter Ltd, Redditch (GB)

(72) Inventors: Jeremy George David Fitton, Redditch (GB); David Graham Taylor, Rudgwick (GB)

(73) Assignee: SkyLifter Ltd, Redditch (GB)

(*) Notice: Subject to any disclaimer, the term of this patent is extended or adjusted under 35 U.S.C. 154(b) by 0 days.

(21) Appl. No.: 18/693,706

(22) PCT Filed: Sep. 22, 2022

(86) PCT No.: PCT/GB2022/052397
§ 371 (c)(1),
(2) Date: Mar. 20, 2024

(87) PCT Pub. No.: WO2023/047110
PCT Pub. Date: Mar. 30, 2023

(65) Prior Publication Data

US 2024/0317381 A1 Sep. 26, 2024

(30) Foreign Application Priority Data

Sep. 22, 2021 (GB) ...................................... 2113520

(51) Int. Cl.
*B64B 1/70* (2006.01)
*B64B 1/58* (2006.01)
*B64D 1/22* (2006.01)

(52) U.S. Cl.
CPC .................. *B64B 1/70* (2013.01); *B64B 1/58* (2013.01); *B64D 1/22* (2013.01)

(58) Field of Classification Search
CPC .... B64B 1/58; B64B 1/70; B64B 1/40; B64B 1/42; B64B 1/44; B64B 1/48; B64B 1/50; B64B 1/66; B64D 1/22
See application file for complete search history.

(56) References Cited

U.S. PATENT DOCUMENTS 2,038,671 A 4/1936 Olán
6,231,007 B1 * 5/2001 Schafer ..................... B64B 1/70 244/116

(Continued)

FOREIGN PATENT DOCUMENTS

CA 2817640 A1 7/2014
DE 19811794 A1 * 9/1999 ............... B64B 1/22

(Continued)

OTHER PUBLICATIONS

International Search Report issued in International Application No. PCT/GB2022/052397 dated Dec. 9, 2022.

*Primary Examiner* — Joshua D Huson
*Assistant Examiner* — Anna L. Gordon
(74) *Attorney, Agent, or Firm* — Vos-IP, LLC

(57) ABSTRACT

An airship comprising an airship body, a ballast assembly comprising at least one ballast pod (3) coupled to the airship body, and a payload lifting device (4, 6) coupled to the airship body and configured to lift a payload wherein the ballast assembly is configured to vary a weight force applied to the airship body by said ballast pod (3) when a payload is applied to the payload lifting device (4, 6) while the ballast pod (3) is coupled to the airship body and is in contact with a planetary surface (8).

14 Claims, 3 Drawing Sheets

(56) References Cited

U.S. PATENT DOCUMENTS

| | | | | |
|---|---|---|---|---|
| 9,022,315 | B2 * | 5/2015 | Kirt | B64B 1/30 244/30 |
| 2011/0233325 | A1 * | 9/2011 | Kramer | B64B 1/58 244/30 |
| 2015/0130936 | A1 * | 5/2015 | Coram | G05D 1/0866 348/144 |

FOREIGN PATENT DOCUMENTS

| | | | | | |
|---|---|---|---|---|---|
| DE | 10054673 | A1 | | 5/2002 | |
| EP | 0282425 | A1 | | 9/1988 | |
| GB | 191419 | A | | 1/1923 | |
| KR | 20180091825 | A | * | 8/2018 | |
| RU | 2654879 | C1 | | 5/2018 | |
| WO | WO-0066424 | A1 | * | 11/2000 | B64B 1/52 |
| WO | WO/2015/108607 | A2 | | 7/2015 | |
| WO | WO/2020/245527 | A1 | | 12/2020 | |

* cited by examiner

AIRSHIP

CROSS-REFERENCE TO RELATED APPLICATIONS

This application is a 371 National Phase Entry of International Patent Application No. PCT/GB2022/052397 filed on Sep. 22, 2022, which claims the benefit of British Patent Application No. 2113520.7 filed on Sep. 22, 2021, the contents of which are incorporated herein by reference in their entirety.

FIELD OF THE INVENTION

This invention relates to buoyancy management systems, in particular in use with airships.

BACKGROUND OF THE INVENTION

Airships are a type of lighter-than-air, powered aircraft. They are classified according to their method of construction into rigid, semirigid and nonrigid types. A rigid airship has a rigid framework covered by an outer skin or envelope. The interior contains one or more gasbags, cells, or balloons to provide lift. Rigid airships, like the historic Zeppelins, are typically unpressurised and can be made to be virtually any size. A semirigid airship has minimal supporting framework, and the main envelope is held in shape by the internal pressure of the lifting gas. Typically, but not always, a semirigid airship has an extended, usually articulated keel running along the bottom of the envelope to stop it kinking in the middle. Nonrigid airships are large gasbags and are often called "blimps." They rely entirely on internal gas pressure to retain their shape during flight.

Airships have low operating costs compared to aircraft and helicopters but are limited in several ways, including low payload to volume ratios and low speeds. Additionally, ground handling of an airship can be difficult: because it is floating, it is susceptible to wind buffeting in even a light breeze.

New designs of airship, called hybrid airships, have been developed in recent years. A hybrid airship is a powered airship that obtains some of its lift as a lighter-than-air airship and some from aerodynamic lift as a heavier-than-air aerodyne. Hybrid airships combine the airship's aerostatic lift from a lighter-than-air gas such as helium with the heavier-than-air craft's dynamic lift coming from movement through the air. Thus, the bodies of hybrid airships can have airfoil shapes to induce aerodynamic lift when the airship is moving, allowing it to carry heavier weights. Hybrid airships are not designed to be tethered because they are powered aircraft that obtain some of their lift as a lighter-than-air airship and some from aerodynamic lift.

Revolutionary new designs of airships now exist which have no rigid structural framework yet surprisingly can still carry substantial loads. An example is the SkyLifter airship, which is a symmetrical, disc-shaped, omnidirectional airship. It has no rigid framework and consists of a tough external skin enclosing a volume filled with inflatable ballonets which provide buoyancy when filled with gases like hydrogen or helium.

Omnidirectional airships are designed to pick up and transport loads to remote locations where it would be difficult for a large crane to access. This design of airship needs to be able to hover above a geostationary position in variable wind conditions including conditions of no wind. Because the circular design does not generate lift, it is not a hybrid airship. Indeed, aerodynamic lift would interfere with its ability to hover precisely. Buoyancy can be increased or reduced by inflating the ballonets with gas from storage tanks or by compressing it. By not having the weight of a rigid skeleton, the airship is able to lift so much more than a rigid airship with an internal framework. Typical operating ceilings are up to 3,000 meters and designs exist which could carry 150 metric tons.

Some omnidirectional airships are equipped with electric motors driving propellers which can be made to thrust in all directions in a process called thrust vectoring. The motors are useful for assisting the lifting of the airship to its operating height by providing vertical thrust, helping to maintain station in winds and also for moving to new geographical locations.

Airships have traditionally required mooring masts to load and unload cargo or passengers. Some modern airships, such as hybrid airships, are designed to land to achieve this load exchange. However, coming into close contact with the ground can lead to stability issues and a number of unfortunate groundings have occurred.

Airships can have substantial lifting capacity. 1 cubic meter of hydrogen or helium provides lift of approximately 1 kg (at mean sea level), so 1,000 cubic meters will lift 1 metric ton. 100 or 200 metric tons of lift is possible simply by having an envelope big enough to contain 100,000 or 200,000 cubic meters. To keep it at a steady altitude the airship needs to carry ballast to counteract this lifting force.

Water or sand are very useful ways of carrying ballast as they are easy to load from a source on the ground and authorized for release when the airship is flying. If the airship is positively buoyant at ground level, then it needs to be guyed down or tethered to prevent it ascending. Once it is released it will ascend because of its positive buoyancy. If the airship is neutrally buoyant at ground level, then it will not ascend once released. To make it ascend, it needs to be made positively buoyant by releasing ballast. Alternatively, more lifting gas can be put into the balloon envelope to make it positively buoyant.

A positively buoyant airship needs to have its buoyancy reduced to descend. A reduction in buoyancy can be achieved by releasing or compressing some lifting gas. When the airship comes close to the ground it can be tethered or guyed to keep it in place. Ascending and descending can be helped by onboard motors.

Maintaining the correct altitude can be difficult for airships particularly close to the ground.

There is an urgent need for better alternatives to cranes and helicopters to service the large and rapidly growing installed base of wind turbines around the world. World wind farm capacity, essential for meeting climate change targets, is set to grow 10-fold by 2050. Wind Turbines are getting bigger and bigger and there simply are not enough cranes or helicopters to do the job. Using airships as air cranes to lift wind turbine blades from the ground and to attach them to wind turbine pylons is an effective alternative to land cranes and helicopters which overcomes the cost and site access limitations of land cranes or helicopters, significantly lowering the cost of large infrastructure projects.

However, a serious problem exists when an airship is used as a flying crane, which the present invention, surprisingly, overcomes.

If the airship has a lifting capacity of, say, 25 metric tons, then to fly from its base to the operating site it needs to carry nearly 25 metric tons of ballast. When it reaches the operating site, small adjustments in its buoyancy will bring it close to the ground. To operate as a crane with a 25-metric ton lifting capacity it then needs to be held close to the ground and the ballast needs to be unloaded. Once this has happened, the airship is now able to lift a load of up to 25 metric tons from the ground, such as a wind turbine blade, and put this into position on the wind turbine pylon.

Once the task has been completed, the airship then needs to pick up the original ballast to achieve the correct buoyancy so that it can return to base. The unloading and reloading of 25 metric tons ballast can be a seriously difficult operation if the airship is hovering over the target, as there may be no convenient site close to the target where this can happen without the ballast interfering with operations around the base of the target. A further problem is that having unloaded the ballast away from the target site, the airship is now very buoyant and difficult to control. Bringing it back to the target site to perform the lifting operation becomes extremely difficult. Tethers need to be attached and means provided for towing the airship back into position, such as using winches or heavy towing vehicles. These winches or towing vehicles need to be delivered to site ahead of the arrival of the airship with all the associated difficulties of access and cost which greatly reduce the advantages of using an airship as a crane in the first place.

Attaching tethers to the ground can also be a complicated process. Strong anchors need to be driven into the ground to resist the high uplift forces. This can be achieved by burying anchors under a sufficient weight of soil or by driving in large anchors using earth augers for example. However, these methods require substantial pieces of plant to be delivered to site ahead of the arrival of the airship. How successful they are depends on the nature of the ground: if it is solid rock or concrete, for example, these methods will not work at all.

Some designs of airships propose using suction devices which are attached to the airship bottom to solve this problem by creating suction to help hold the airship to the ground. These would, however, be impractical to use on any loose surface such as earth, gravel, or snow, and impossible to use over water.

The process of unloading and reloading the ballast and the picking up and placing the load, is known as "load exchange."

The load exchange is particularly problematic where the wind turbines are based in the sea: a barge or similar would be required to carry the ballast while work is carried on. This increases expense and complexity as well as introducing the safety issues of handling heavy loads above a barge which may be moving up and down due to wave motion.

Hence there is an urgent need for an effective solution to the problem of load exchange so that airships can become a vital part of the process of growing and maintaining the increasing population of wind turbines in the world.

It is an aim of the present invention to at least partially address the problems noted above.

SUMMARY OF THE INVENTION

According to the present invention, there is provided an airship comprising an airship body, a ballast assembly comprising at least one ballast unit coupled to the airship body, and a payload lifting device coupled to the airship body and configured to lift a payload, wherein the ballast assembly is configured to vary a weight force applied to the airship body by said ballast unit, when a payload is applied to the payload lifting device while the ballast unit is coupled to the airship body and while the ballast unit is in contact with a planetary surface. It will be understood that the planetary surface (or terrestrial surface) may be land (i.e., the ground), sea, or other such surface whose weight is borne by the terrestrial surface, such as a truck or barge (i.e., is not airborne).

Optionally, the ballast assembly comprises a plurality of said ballast units.

Optionally, the ballast unit is movable relative to the airship body.

Optionally, the ballast unit is coupled to the airship body by a cable of adjustable length.

Optionally, the weight force is applied to the airship body by tension in the cable.

Optionally, the airship further comprises a winch configured to adjust the length of the cable.

Optionally, the winch forms part of the ballast unit.

Optionally, the ballast unit is selectively detachable from the cable.

Optionally, the airship is configured to maneuver by selectively varying the length of one of a plurality of said cables while said ballast unit is in contact with a planetary surface, such as the ground.

Optionally, the ballast unit comprises a refillable container configured to hold a variable amount of ballast material.

Optionally, the container is at least partially hollow.

Optionally, the container is configured to hold a liquid.

Optionally, the container is configured to be refilled by immersion in a liquid.

Optionally, the container is configured to hold sand or rocks.

Optionally, the ballast unit comprises a release mechanism configured to selectively release the ballast material.

Optionally, the release mechanism is a valve.

Optionally, the airship body comprises a lenticular shaped envelope configured to contain lifting gas, and a control pod configured to hang beneath the envelope.

BRIEF DESCRIPTION OF THE FIGURES

The present invention will now be described, by way of nonlimitative example only, with reference to the accompanying drawings, in which.

DETAILED DESCRIPTION OF THE INVENTION

The present invention relates to an airship including an airship body and a ballast assembly. The ballast assembly comprises a system of ballast weights (which may be referred to as "ballast pods" or "ballast units") that are part of the airship when in operation, and which can be much more easily deployed and recovered than is presently possible with known ballast arrangements. The ballast pods (3) are connected to the airship by cables (5) or similar which can themselves be attached to winches. It will be understood that any suitable number of ballast pods may be provided, and that, in some arrangements, any features of a particular ballast pod may apply to some or all of the ballast pods.

Figure 1:
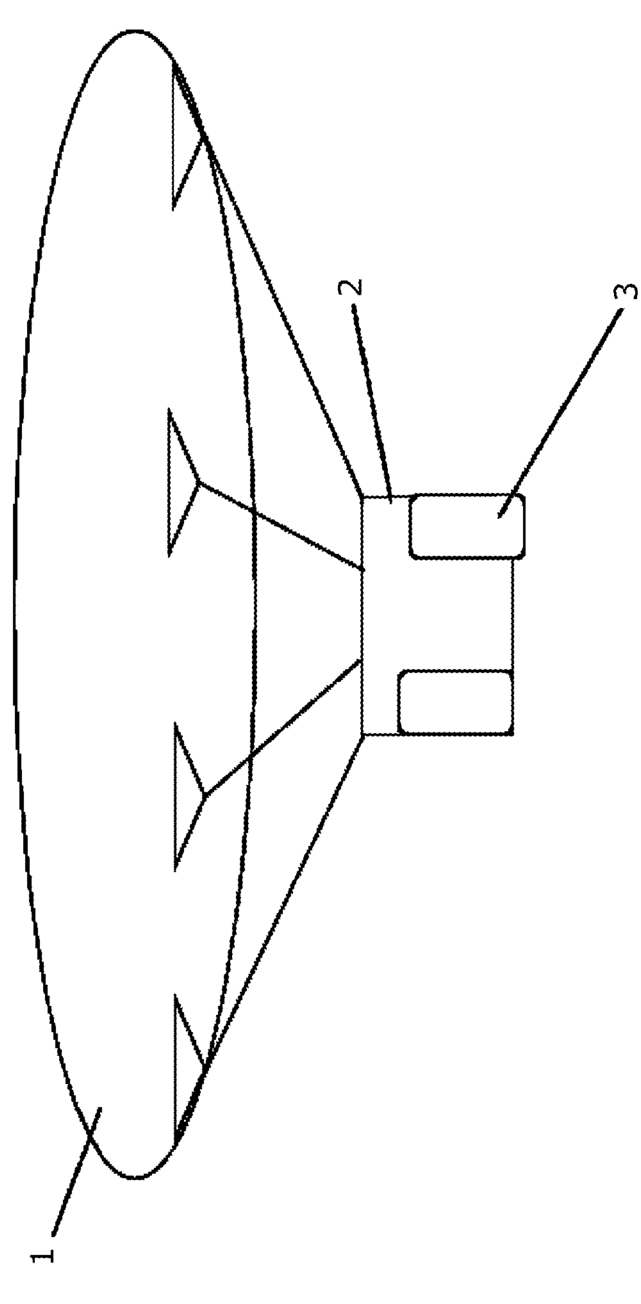
FIG. 1 shows a schematic view of an airship according to the present invention.
Figure 2:
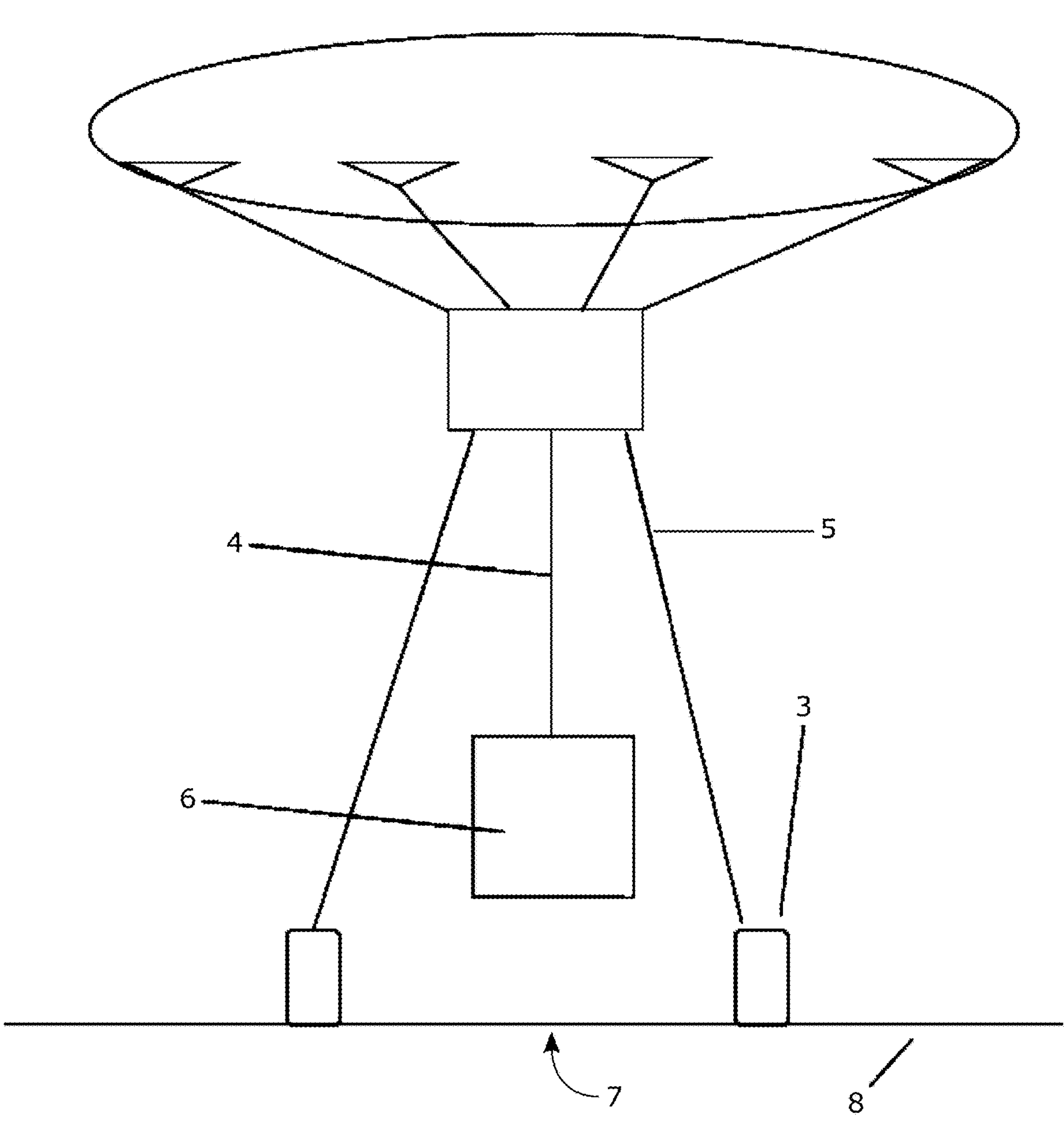
FIG. 2 shows the airship of FIG. 1, with ballast pods positioned on the ground and an object being lifted by a lifting device of the airship.
Figure 3:
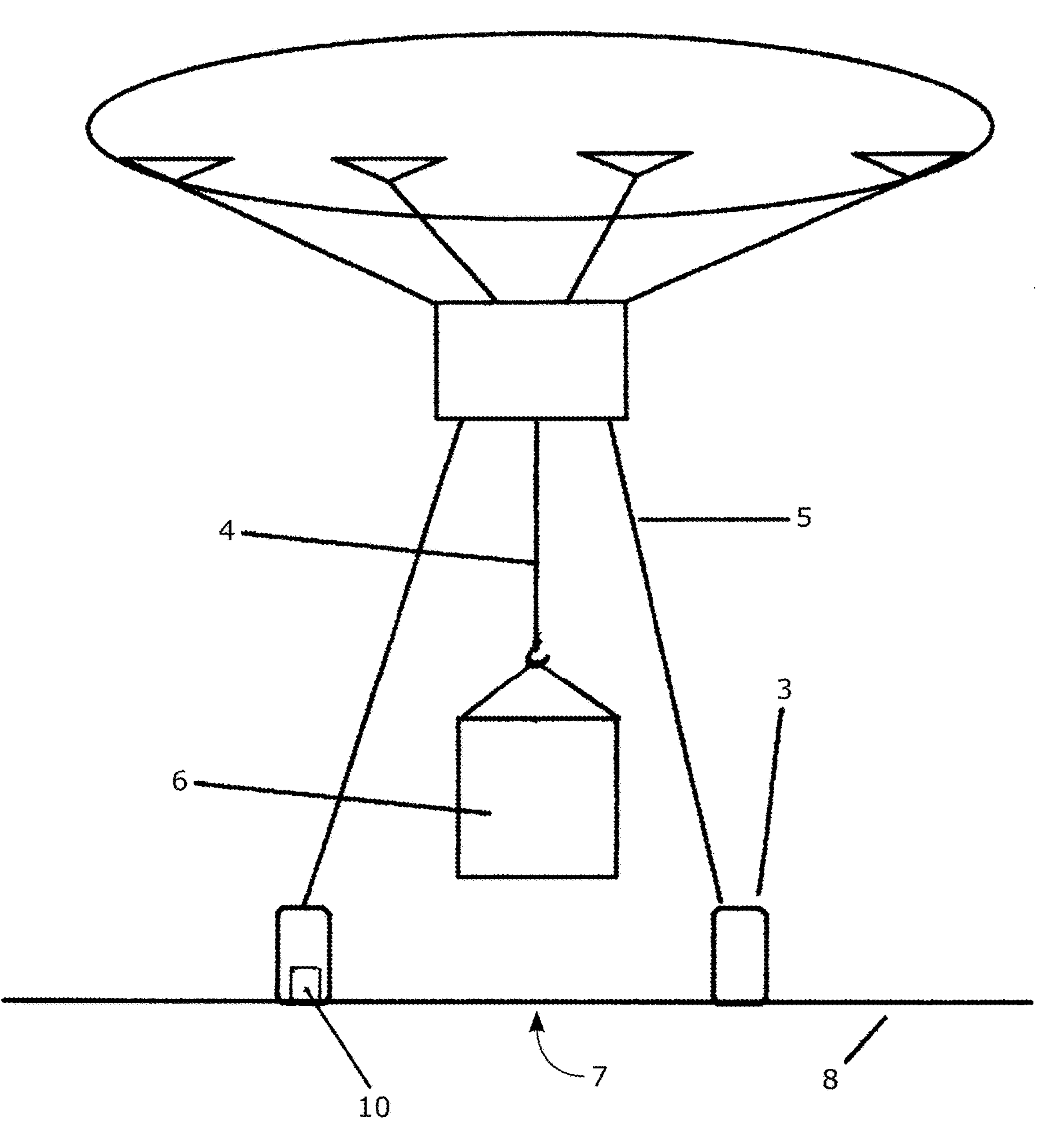
FIG. 3 shows a schematic view of an airship according to the present invention, in a similar configuration to FIG. 2, with a ballast pod comprising a valve, and a hook lifting the payload.

In some arrangements, including those shown in FIGS. 1-3, the airship body comprises a lenticular shaped envelope (1) (also known as a hull or flexible membrane) configured to contain lifting gas, and a control pod (2) configured to hang beneath the envelope. It will be understood that other shapes of envelope may also be used. The control pod (2) may be used to carry a pilot (i.e., serve the purpose of a cockpit) and/or may house control equipment configured to control the airship (e.g., for an unmanned airship).

The airship comprises a payload lifting device (4) configured to lift a payload. The payload lifting device may comprise a lifting cable, a payload winch, and a hook (the latter of which is illustrated in FIG. 3, although will be understood that such an arrangement is equally applicable to the arrangements of FIGS. 1 and 2). The payload lifting device is coupled to the airship body. Where the airship body comprises an envelope, and a control pod as described above, the payload lifting device may be coupled to the envelope and/or the control pod. Although FIG. 3 depicts a lifting cable and hook, it will be understood that any other suitable payload lifting device may be used.

The lifting device thus allows the airship to act as a crane (i.e., to move objects from one location to another). Such an airship may be of particular use in lifting large and/or heavy objects, and in particular components of wind turbines, such as turbine blades and generators. Of course, it will be understood that the airship may be used to lift numerous other objects.

The ballast assembly is configured to create a state of neutral buoyancy for the airship, balancing the upward buoyant force with the downward gravitational force. In order to provide such a balance, the ballast assembly is configured to vary a weight force applied to the airship body by the ballast units while the ballast units remain coupled to the airship body. This may be helpful in the process of "load exchange" described above. As will be explained below, achieving the state of neutral buoyancy may be implemented in several different ways.

In a first embodiment, the ballast pods (i.e., ballast units) take the form of weights (3) which are attached to the airship by cables (5) or other elongate flexible members. In flight, the ballast pods may be stowed as part of the airship body (e.g., the control cabin or pod [2]), or elsewhere on the airship. In some arrangements, the majority of the mass of the ballast pods may be formed of a solid material.

The cables may be of adjustable length. The length may be adjusted by any suitable means. In one arrangement, the cables are attached to winches provided on the airship body, which can be used to change the length of the cables (i.e., to adjust the distance between the ballast pods and the airship body). In some arrangements, the winches form part of the ballast pods, such that the winches move up and down with the ballast pods. In other arrangements, the winches may be provided on the airship body. It will be understood that when the length of the cables is increased, the ballast pods (3) may be lowered toward the ground, as shown in the transition between FIGS. 1 and 2.

The ballast pods can be individually controlled by their respective winches. For example, in some arrangements, a single ballast pod can be lowered while the position of the other ballast pods is kept the same. Further, in some arrangements, the ballast pods can be controlled collectively via a ballast control system, which may be operated by an operator (e.g., a pilot) or automatically. Selective control of the number of ballast pods raised and lowered may allow the operator (or an automatic control system) to select the correct configuration to suit the payload. Some or all of the ballast pods may also be selectively detachable from the ballast assembly.

When the ballast pods are attached to the airship body, or if the ballast pods are hanging from the cables and the cables are taut, the weight of the ballast pods acts on the airship body (i.e., the full weight of the pods is applied as a gravitational or weight force), applied by tension in the cables. If the ballast pods are lowered on to the ground while the airship is still airborne, and the tension in the cables reduces (which may be due to a load being picked up), the full weight of the ballast pods no longer acts on the airship (because at least part of the weight of the ballast pods is supported by the ground, and less tension force is applied through the cables). In this state, the airship is again in vertical equilibrium (i.e., neutrally buoyant).

During the process of lowering the ballast pods and picking up an object using a lifting device (i.e., while the load exchange described above is taking place), the gravitational force applied to the airship body may vary in a transient manner due to the dynamic changes in forces while the airship returns to neutral buoyancy.

When the airship is in the neutrally buoyant state described above with the ballast pods lowered to the ground, a payload may then be attached to the airship. In this situation, the weight of the payload may act on the airship, which in turn may reduce the tension in the cables (and thus reduce the weight force applied to the airship body by the ballast pods, even though the ballast pods are still coupled to the airship body). This provides the "load exchange" described above. In other words, the increase in downward force exerted on the airship body by the weight of the payload is balanced by a corresponding reduction in the weight force of the ballast which is exerted on the airship body. This reduction (i.e., variation) in weight force may take place while the ballast pods are in contact with the ground (i.e., a planetary surface) and while the ballast pods are coupled to the airship body (i.e., without the ballast pods being removed).

Although the above description refers to the ground (i.e., land), the above explanation may also be applicable to floating ballast pods which are lowered to the sea.

The operation of an airship according to the invention will now be described. It will be understood that the values below are merely illustrative and provided in order to illustrate the principle of the invention, and that any suitable values may be used in practice.

When the airship arrives on site, the ballast pods are lowered and put into position on the ground around the point where lifting is going to happen (7). If the airship has a lifting capacity of, say, 25 metric tons and the ballast pods cumulatively weigh 25 metric tons, then once the ballast pods are in contact with the ground (8), the full 25-metric ton lifting capacity of the airship is available for lifting.

In some arrangements, when the ballast pods are in contact with the ground, the airship may maneuver by selectively varying the length of the cables. That is, the airship can adjust its position over the payload (6) (or target) by winching (i.e., shortening or lengthening) the cables (5) attached to the ballast pods.

Once the task of lifting the load into place is complete, and the payload is no longer on the hook, the ballast pods can be raised back up and secured to the body of the airship (and, in some arrangements, may be retractable into the body of the airship). The airship can then return to base or move to its next lifting job.

In some arrangements, the ballast pods include hollow or semihollow containers which can be filled with a liquid (such as water) or other ballast materials (such as rocks or sand). In other words, the containers are refillable and configured to hold (i.e., contain or store) a variable amount of ballast material. The containers may also be configured to selectively release ballast material (i.e., by emptying the ballast material from the containers). The release may be provided by valves, doors, or any other suitable mechanism. This selective release of ballast material may allow a controlled variation in the weight force applied by the ballast units to the airship body. Thus, the force exerted by the ballast units can be varied while the ballast units themselves remain coupled to the airship body. Again, this may be helpful in the "load exchange" process described above, as well as for buoyancy control purposes. As will be explained below, this design can be used over land but is particularly useful over water.

Where ballast pods including refillable containers are used, the ballast pods may also be provided with cables of adjustable length, as described in the embodiment set out above. In this way, the gravitational (or weight) force applied by the ballast pods to the airship body may be varied both by adjusting the length of the cables and carrying out the load exchange with the pods on the ground, as described above in relation to solid ballast pods, and by varying the amount of ballast material in the containers. It will also be understood that in some arrangements, adjustments in the weight force applied to the airship body may also be provided by adjusting the amount of ballast material in the pods regardless of whether they are positioned on the ground or not. For example, some amount of ballast may be jettisoned while the airship is in flight. Likewise, ballast may be added without the airship or the ballast pods having to land (e.g., by moving the pods close to the ground). This may allow the buoyancy of the airship to be adjusted (both increased and decreased) by changing the amount of ballast in the pods without the airship having to moor or land.

The use of these hollow or semihollow ballast pods is best demonstrated by the following examples. It will be understood that the values below are merely illustrative and provided in order to illustrate the principle of the invention, and that any suitable values may be used in practice.

In one instance, an airship capable of lifting, say, 200 metric tons flies to an offshore wind turbine to carry out the removal of, say, a 200-metric ton generator from the turbine. In the flight out to the wind turbine the airship needs to carry 200 metric tons of ballast to achieve neutral buoyancy. It does this by carrying 200 metric tons of water in the hollow ballast pods which have been filled onshore by lowering the hollow ballast pods to the ground for filling with water. When the airship arrives over the offshore wind turbine it holds itself in position using its motors and next lowers its hook to be attached to the generator. When the airship is ready to lift the generator, valves in the ballast pods are then opened and the ballast water is released into the sea. Once the release of water is complete, the airship has sufficient buoyancy to lift the generator and the generator is then removed. The weight of the generator then becomes the ballast for the airship to achieve neutral buoyancy again, for the flight back to its onshore depot.

When the airship reaches the onshore depot, the motors again hold it stationary and the empty ballast pods are lowered to the ground. Once on the ground they are then filled with 200 metric tons of water. Once this has happened the airship is ballasted ready for the release of the generator, which is then lowered to the ground to be transported away for repair. The airship is then neutrally buoyant as the ballast pods are winched back up to the airship where they are secured into position again.

If the airship is used to install a generator on an offshore wind turbine the following procedure takes place. The ballasted airship described in the previous paragraph is flown to the place where a new generator is waiting. Once overhead, it lowers its ballast pods to the ground. The airship then has 200 metric tons of buoyancy available to lift the generator using its winches. Once the generator is off the ground, the airship becomes neutrally buoyant again thanks to the weight of the new generator even though there are 200 metric tons of water in the ballast pods which are sitting on the ground. When the airship is ready to fly out to the wind turbine out at sea, the valves in the hollow ballast pods are opened and the water is released. Once released the empty ballast pods can be winched back up into position and the airship can fly to the offshore wind turbine where the generator is installed.

Releasing water through a valve has the advantage of providing a relatively gentle release for the airship from the anchoring effects of the filled ballast pods so that no sudden jerking occurs. An alternative to the valve can be a hinged flap or flaps on the bottom or lower parts of the ballast pod which would permit more rapid release of water or filling with water.

When the airship arrives over the wind turbine at sea, it is held above the wind turbine by its motors. The empty ballast pods are then lowered into the sea. The valves are then opened, and the ballast pods are allowed to fill up. Once they are filled, the generator is lowered into position for installation on the turbine. Once it is installed and ready for release, the airship will become 200 metric tons lighter and so needs to take on 200 metric tons of ballast to keep it in neutral buoyancy and prevent it from flying upward. Because the ballast pods are already filled with water (but underwater) as soon as the airship starts to lift the ballast pods lift out of the water and exert their full 200-metric ton ballast weight as they become clear of the water. The airship is again neutrally buoyant.

One embodiment of the hollow ballast pods for an airship is shown in FIG. 3. The hollow ballast pods include one or more containers with appropriate volume and strength to contain the water (or other ballast) securely. Each container has one or more valves which can be opened and closed either remotely by means of an electrical current to an actuator or some mechanical device such as a link connected to the release and closing mechanism. Such a release and closing mechanism may be automatically operated (e.g., by an automatic control system) or manually operated (e.g., by a pilot or other operator). The valve or valves (10) are big enough to allow the rapid filling or emptying of the hollow ballast pod if required. A rapid way of emptying the hollow ballast pod would be for part or whole of the bottom or sides of the ballast pod to include a door or doors which can be opened allowing the water (or other ballast) to be filled or emptied rapidly.

As described above in relation to the first embodiment, the hollow ballast pods may have a means of connection to the cable or cables which are attached to the winches used for lowering and raising them. Further, as set out above, the ballast pods may be detachable from the ballast assembly. In some circumstances, this may allow quicker turnaround of the airship during the picking up of ballast, as ballast pods which have been emptied may be interchanged for prefilled ballast pods.

It should be understood by those skilled in the art that while the present invention has been described with reference to exemplary embodiments, it is not limited to the disclosed exemplary embodiments. Various modifications, combinations, subcombinations and alterations may occur depending on design requirements and other factors insofar as they are within the scope of the appended claims or the equivalents thereof. Features from any example or embodiment of the present disclosure can be combined with features from any other example or embodiment of the present disclosure.

What is claimed is:

1. An airship comprising:

an airship body;

a ballast assembly comprising a plurality of ballast units coupled to the airship body; and a payload lifting device coupled to the airship body and configured to lift a payload;

wherein the ballast assembly is configured to vary a weight force applied to the airship body by said ballast units when the payload is applied to the payload lifting device while the ballast units are coupled to the airship body and are in contact with a planetary surface;

wherein each of the ballast units and the payload lifting device are each independently movable relative to each other and to the airship body and the payload lifting device is configured to lift the payload while at least one of the plurality of ballast units is in contact with the planetary surface; and wherein each ballast unit has a respective cable of adjustable length and a respective ballast unit winch configured to independently adjust the length of each cable to lift each ballast unit wherein the airship is configured to maneuver by selectively varying the length of a plurality of said cables when said plurality of ballast units is in contact with the planetary surface.

2. The airship of claim 1, wherein the weight force is applied to the airship body by tension in the cable.

3. The airship of claim 1, wherein the winch forms part of the ballast unit.

4. The airship of claim 1, wherein each ballast unit is selectively detachable from its respective cable.

5. The airship of claim 1, wherein the ballast unit comprises a refillable container configured to hold a variable amount of ballast material.

6. The airship of claim 5, wherein the container is at least partially hollow.

7. The airship of claim 5, wherein the container is configured to hold a liquid.

8. The airship of claim 7, wherein the container is configured to be refilled by immersion in a liquid.

9. The airship of claim 5, wherein the container is configured to hold sand or rocks.

10. The airship of claim 5, wherein the ballast unit comprises a release mechanism configured to selectively release the ballast material.

11. The airship of claim 10, wherein the release mechanism is a valve.

12. The airship of claim 1, wherein the airship body comprises a lenticular shaped envelope configured to contain lifting gas, and a control pod configured to hang beneath the envelope.

13. The airship of claim 1, wherein the payload lifting device comprises a payload winch configured to lift the payload.

14. The airship of claim 13, wherein the payload winch and the ballast unit winch are individually controllable.

* * * * *